United States Patent [19]
Saito et al.

[11] Patent Number: 5,253,177
[45] Date of Patent: Oct. 12, 1993

[54] PHOTO-SOLIDIFICATION MODELING DEVICE

[75] Inventors: Naoichiro Saito; Seiji Hayano, both of Tokyo, Japan

[73] Assignee: Mitsubishi Corporation, Tokyo, Japan

[21] Appl. No.: 694,333

[22] Filed: May 1, 1991

[30] Foreign Application Priority Data

May 2, 1990 [JP] Japan .................. 2-115271
Nov. 2, 1990 [JP] Japan .................. 2-297536

[51] Int. Cl.⁵ .............................................. G06G 7/48
[52] U.S. Cl. ............................ 364/468; 425/174.4
[58] Field of Search ............... 364/578, 468; 425/174, 425/174.4, 174.6; 264/22

[56] References Cited
U.S. PATENT DOCUMENTS 2,795,758  6/1957  Cahn .
4,801,477  1/1989  Fudim ........................... 425/174.4
5,071,337  12/1991 Heller et al. ................... 425/174.4
5,106,288  4/1992  Hughes .......................... 425/174.4
5,143,663  9/1992  Leyden et al. .................. 425/174.4

FOREIGN PATENT DOCUMENTS 258334    12/1986  France .
56-144478 11/1981  Japan .
60-247515 12/1985  Japan .
2-22035   1/1990   Japan .
89/10254  11/1989  World Int. Prop. O. .
89-10256  11/1989  World Int. Prop. O. .

Primary Examiner—Edward R. Cosimano
Assistant Examiner—Thomas Peeso
Attorney, Agent, or Firm—Finnegan, Henderson, Farabow, Garrett & Dunner

[57] ABSTRACT

A photo-solidification modeling device for forming a solidified image having a desired model shape by exposing to light a liquid capable of being solidified in receipt of the light in a region corresponding to the desired model shape. Data indicative of a regularly spaced region is provided in addition to data indicative of the region corresponding to the desired model shape, and an exposure region is set according to the additional data. Accordingly, the generation of distortion of the model during the modeling process can be well suppressed without considering and inputting a position or the like of the supporting rib.

4 Claims, 19 Drawing Sheets

| PATCH NUMBER | FIRST VERTEX COORDINATE | SECOND VERTEX COORDINATE | THIRD VERTEX COORDINATE |
|---|---|---|---|
| P0 | | | |
| P1 | | | |
| PI | XI1, YI1, ZI1 | XI2, YI2, ZI2 | XI3, YI3, ZI3 |
| PJ | XJ1, YJ1, ZJ1 | XJ2, YJ2, ZJ2 | XJ3, YJ3, ZJ3 |
| PK | XK1, YK1, ZK1 | XK2, YK2, ZK2 | XK3, YK3, ZK3 |
| PN | XN1, YN1, ZN1 | XN2, YN2, ZN2 | XN3, YN3, ZN3 |

FIG. 4

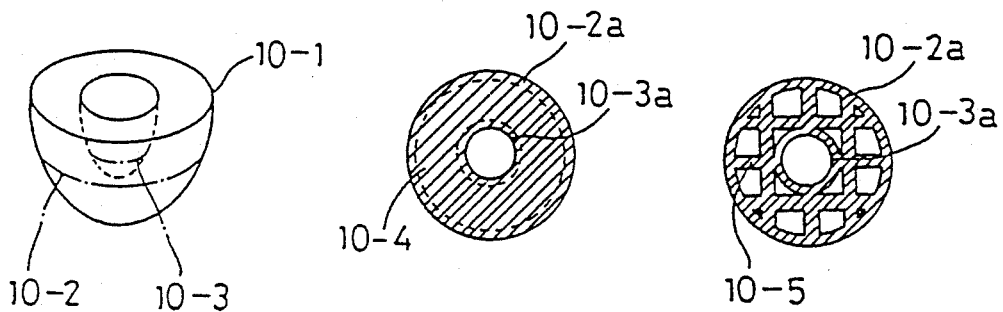
FIG.10(A)   FIG.10(B)   FIG.10(C)
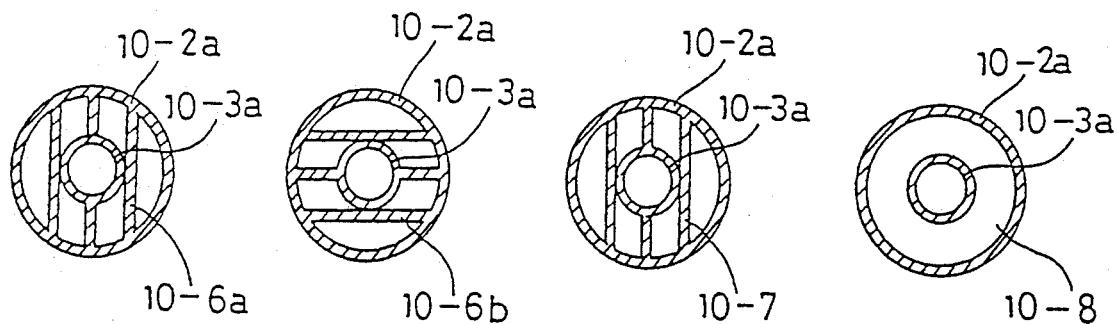
FIG.10(D)1 FIG.10(D)2 FIG.10(E)   FIG.10(F)

PHOTO-SOLIDIFICATION MODELING DEVICE

BACKGROUND OF THE INVENTION

The present invention relates to an improvement in a photo-solidification modeling device for forming a solidified image having a desired model shape by exposing to light a liquid capable of being solidified in receipt of the light in a region corresponding to the desired model shape.

In recent years, there have been widely used a three-dimensional CAD for designing a three-dimensional shape with use of a computer and a three-dimensional measuring instrument such as a continuous tomographic system. It is increasingly demanded to directly visibly confirm the three-dimensional shape on the basis of data relating to the three-dimensional shape created or measured by these systems. It is also increasingly demanded to easily fabricate a model having the three-dimensional shape in a short time on the basis of the above data.

Some noticeable techniques to satisfy these demands are disclosed in U.S. Pat. No. 2,795,758 and Japanese Patent Laid-open Publication No. 56-144478.

According to the known techniques, there is provided a photo-solidification modeling device for forming a solidified image having a desired model shape by exposing to light a liquid capable of being solidified in receipt of the light in a region corresponding to the desired model shape.

In each technique, the solidified image is modeled as follows:

(1) A surface of the liquid is exposed to light in a region corresponding to one section of the desired model shape to thereby form a section solidified image corresponding to this one section.

(2) The liquid corresponding to a further one section is introduced onto the previously solidified image.

(3) A new surface of the liquid is exposed to light in a region corresponding to this further one section to thereby form a new section solidified image on the previously solidified image.

(4) The above steps are repeated for all the other sections to thereby fabricate a three-dimensional solidified image as a laminated section solidified image.

As another technique, there has been proposed in Japanese Patent Laid-open Publication No. 60-247515 a technique of immersing a tip of an optical fiber into the liquid and moving the tip in the liquid in XYZ directions to thereby expose a region corresponding to the desired model shape to light.

However, in this technique, a volumetric change occurs in solidifying the liquid by the exposure, causing distortion of the desired model shape.

To cope with this, the present assignee has proposed in Japanese Patent Application No. 63-252795 a technique of preventing the distortion of the desired model shape by forming a supporting rib simultaneously with the fabrication of the model.

According to this technique, the distortion of the desired model shape during the modeling process can be considerably prevented. However, an operator must decide a forming position of the supporting rib and then set an exposure region corresponding to this position, thus rendering the operation troublesome.

SUMMARY OF THE INVENTION

It is accordingly an object of the present invention to provide a photo-solidification modeling device which can well suppress the generation of distortion of a model during the modeling process without considering and inputting a position or the like of the supporting rib.

According to the present invention, there is provided in a photo-solidification modeling device for forming a solidified image having a desired model shape by exposing to light a liquid capable of being solidified in receipt of the light in a region corresponding to the desired model shape, the improvement comprising means for providing data indicative of a regularly spaced region in addition to data indicative of said region corresponding to said desired model shape and setting an exposure region according to said additional data.

With this construction, a solidified structure, that is, a supporting rib is arranged at regular intervals in a given space, and a model is formed in the given space, thereby preventing the distortion of the model during the modeling process. Further, an operator need not consider and input a position or the like of the supporting rib. Further, a shape such as an overhung shape difficult to model in the conventional method can be easily modeled.

It is preferable that the regular exposure pattern for forming the supporting rib is selectable from a plurality of kinds of predetermined patterns. In this case, various patterns of arrangement of the supporting rib can be set, thereby obtaining various shapes of the model.

It is also preferable that a spatial region for forming the supporting rib therein can be set. In this case, formation of an undue supporting rib is prevented.

More preferably, the above-mentioned spatial region is set in relation to the model. That is, it preferable that the spatial region is selectable from a whole region outside the desired model shape, a whole region below the desired model shape, and a whole region both inside and outside the desired model shape. In this case, the supporting rib can be easily removed after the modeling is terminated.

Other objects and features of the invention will be more fully understood from the following detailed description and appended claims when taken with the accompanying drawings.

BRIEF DESCRIPTION OF THE DRAWINGS

FIG. 4 is an illustration of a data structure of the triangular patch type;

FIG. 10A is a perspective view of a contour of a desired model shape;

FIGS. 10B to 10F are horizontal sectional views illustrating various exposure modes for exposing an inside region surrounded by the contour shown in FIG. 10A;

DETAILED DESCRIPTION OF THE PREFERRED EMBODIMENT

A preferred embodiment of the present invention will now be described in detail.

Figure 1A:
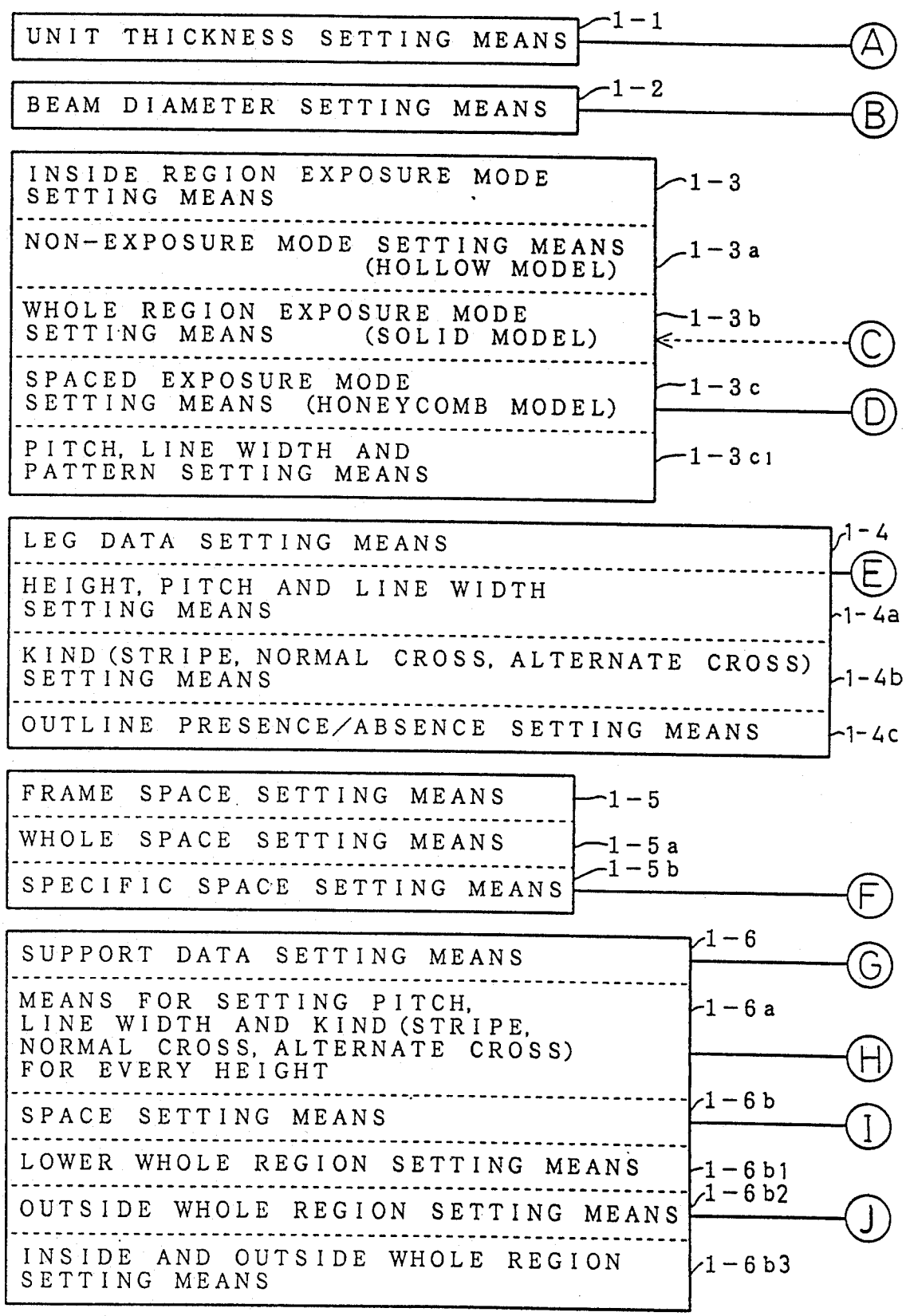
FIGS. 1A to 1C are block diagrams of the system according to a preferred embodiment of the present invention.
Figure 1B:
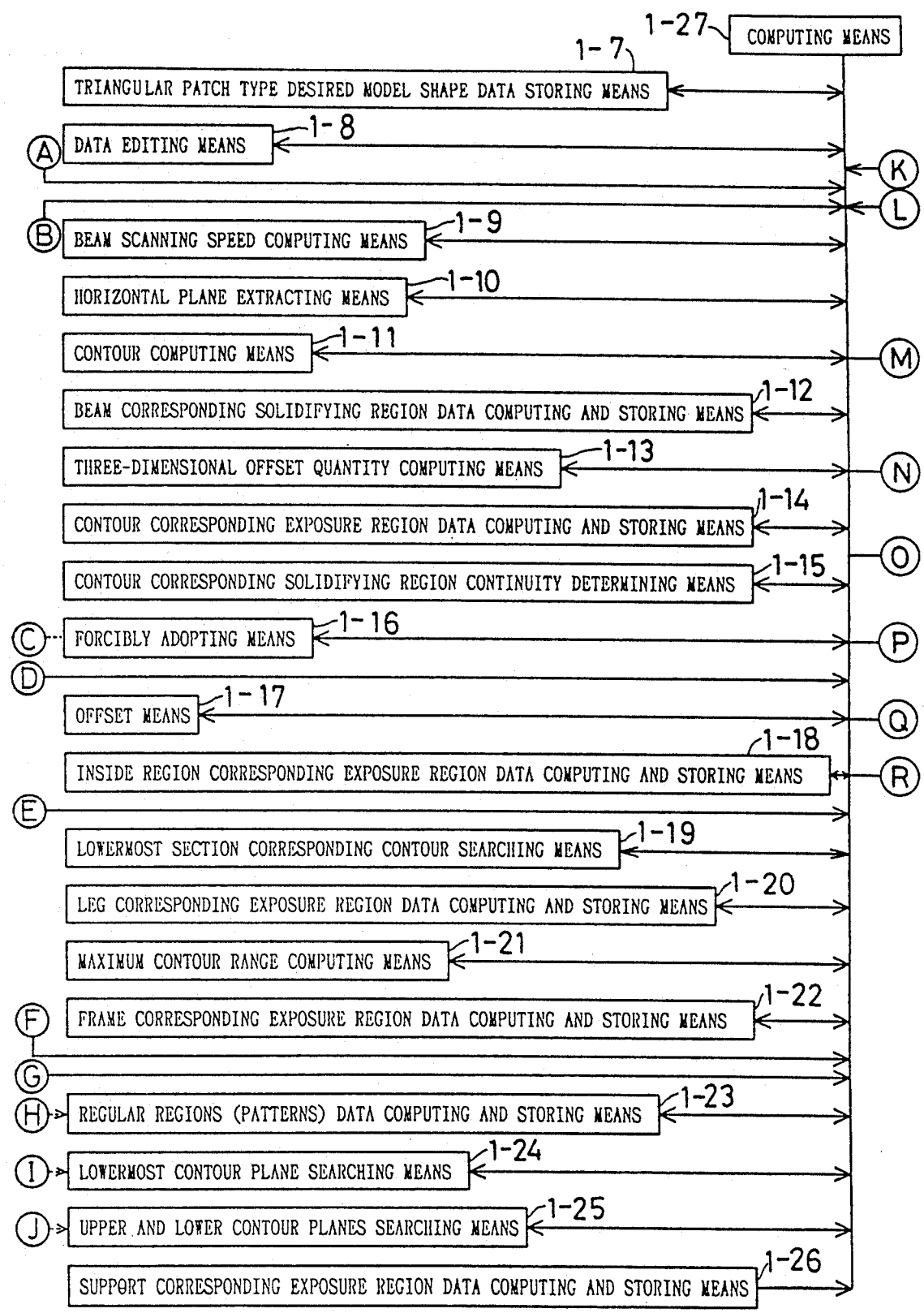
Figure 1C:
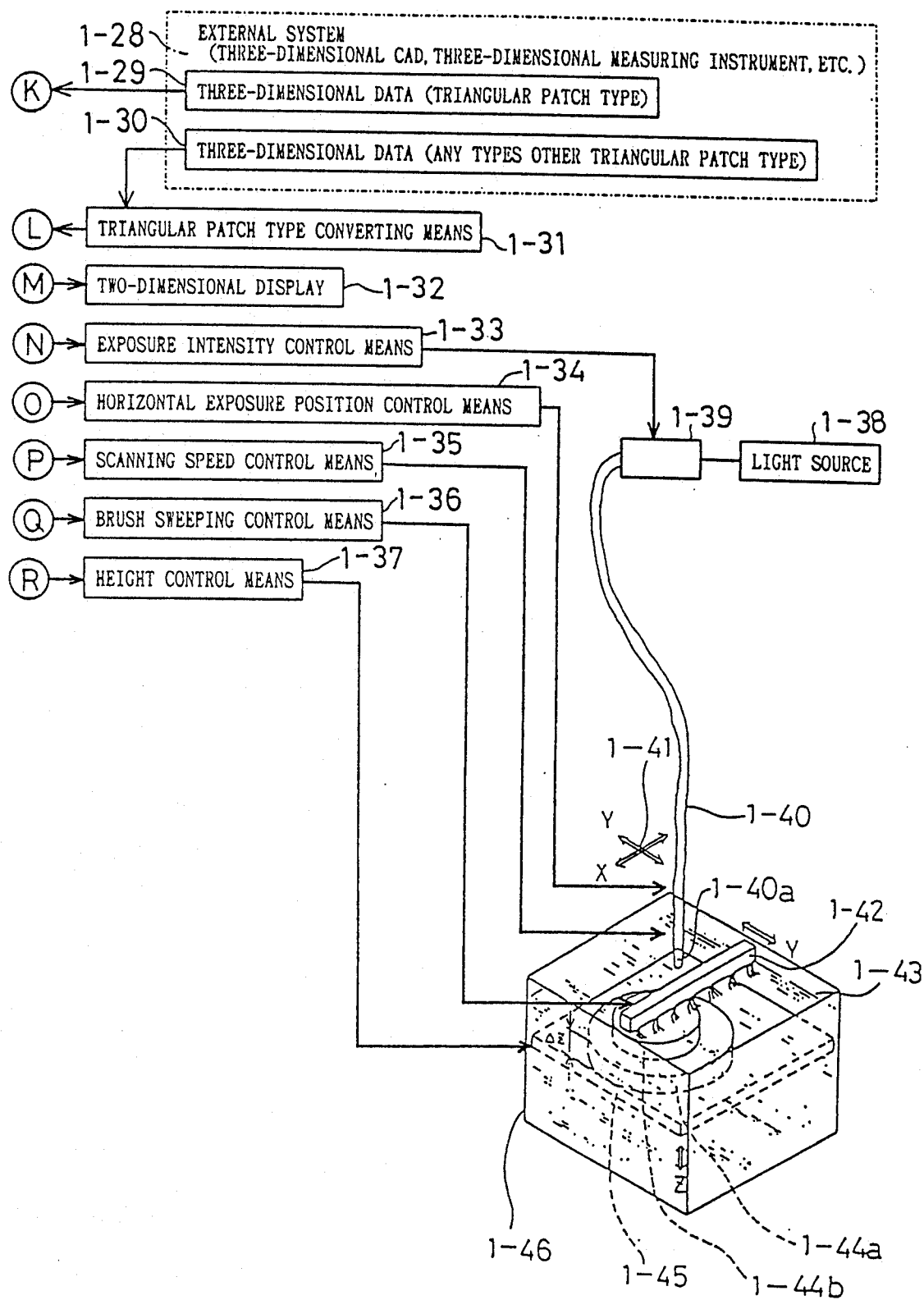
Figure 2A:
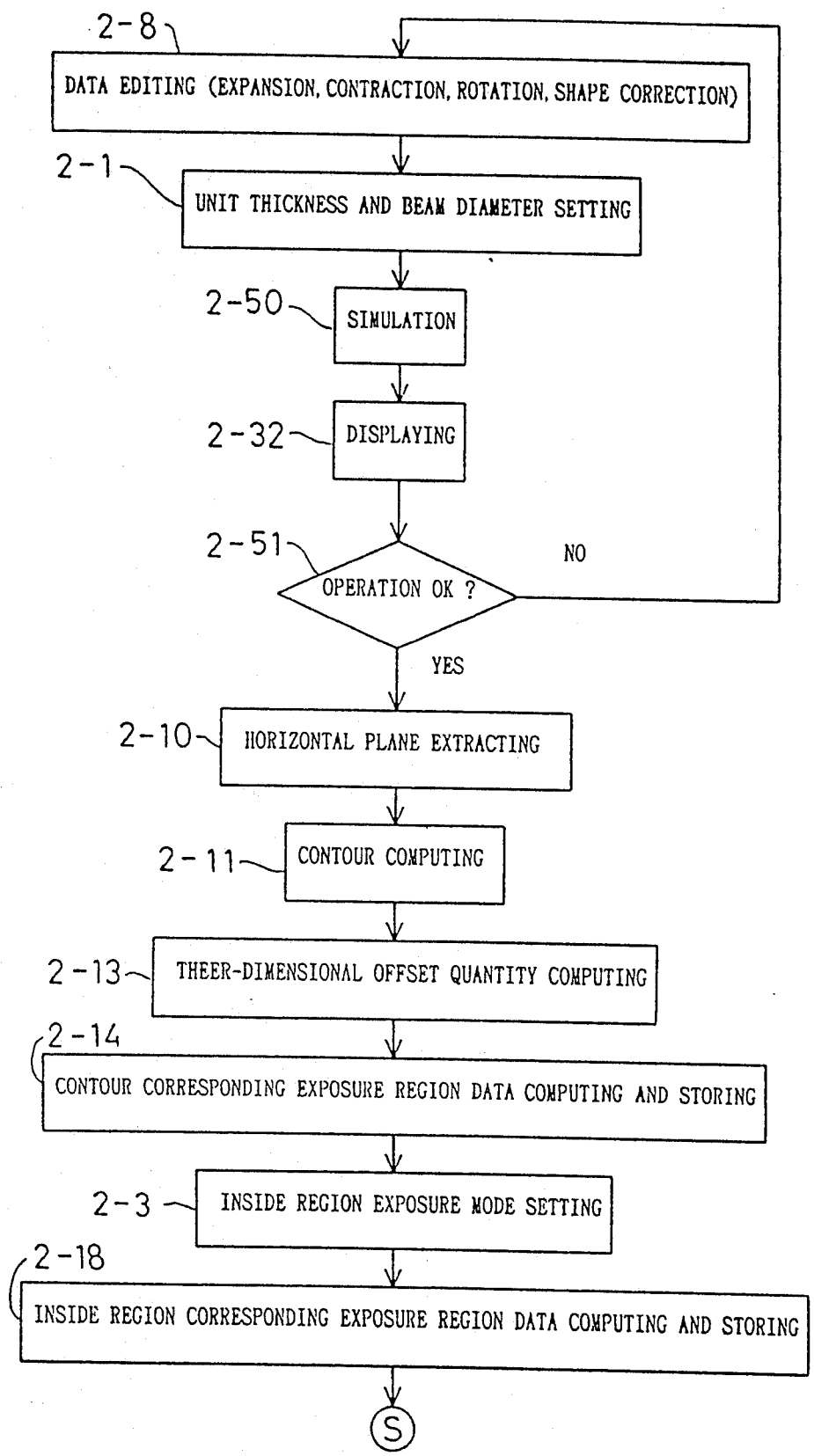
FIGS. 2A and 2B are flowcharts of the essential operation of the system.
Figure 2B:
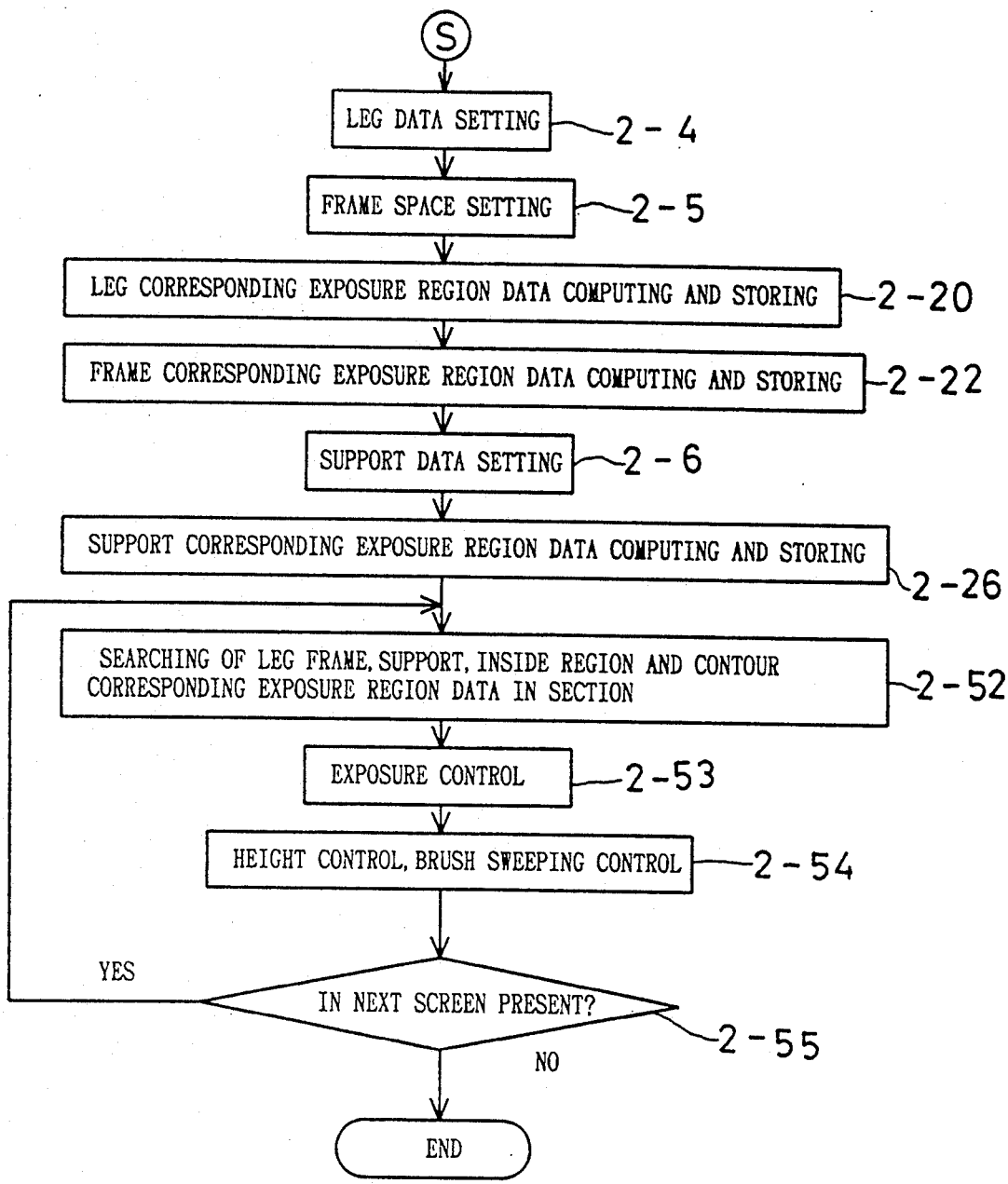

FIGS. 1A to 1C show an example of a system construction of the photo-solidification modeling device improved in utilizing the present invention. FIGS. 2A and 2B show an essential operation of the system shown in FIGS. 1A to 1C.

Referring to FIG. 1C, 1-46 denotes a closed container for storing a liquid having a property of solidification when it is exposed to light. The container 1-46 has a transparent upper surface. The liquid is preferably a photosensitive resin. More preferably, the liquid may be a mixture of one, two or more of deformed polyurethane methyacrylate, oligoester acrylate, urethane acrylate, epoxy acrylate, photosensitive polyimide, and aminoalkyd.

Further, a sensitizer, opaque substance, etc. may be mixed in the liquid, so as to adjust a photoabsorption characteristic or the like. Further, a pigment, ceramics powder, filler, metal powder, etc. may be mixed in the liquid, so as to adjust a color, strength, distortion, modeling accuracy, etc. of a model.

A base 1-45 is vertically (Z direction) movably provided below a liquid surface 1-43 in the container 1-46.

A light source (preferably, a laser) 1-38 is provided above the container 1-46. Light from the light source 1-38 is introduced through a filter 1-39 having both a light shutter function and an exposure quantity adjusting function to an optical fiber 1-40. A tip 1-40a of the optical fiber 1-40 is movable by an XY driving mechanism 1-41 in two orthogonal directions (XY directions).

A brush 1-42 capable of sweeping the liquid surface 1-43 is movable in the Y direction shown.

A solidification modeling part of the present device is formed by the above construction, and it is controlled in the following manner by a system to be hereinafter described.

First, the base 1-45 is lowered from the liquid surface 1-43 by a unit thickness $\Delta Z$ of a model. Under this condition, the tip 1-40a of the optical fiber 1-40 is scanned in the XY direction in a region corresponding to a lowermost section of a desired model shape. As a result, the liquid in the region exposed to light is solidified to form a section solidified image 1-44a corresponding to the lowermost section of the desired model shape on the base 1-45.

Then, the base 1-45 is further lowered by $\Delta Z$. As a result, the lowermost section solidified image 1-44a is also lowered together with the base 1-45, and simultaneously the peripheral liquid is allowed to flow onto the lowermost section solidified image 1-44a.

As the liquid has a high viscosity, the liquid is hard to flow onto the solidified image 1-44a if the base 1-45 is merely lowered by $\Delta Z$. To avoid this disadvantage, the brush 1-42 is operated to sweep the liquid surface 1-43, thereby positively introducing the liquid onto the solidified image 1-44a.

Then, the tip 1-40a of the optical fiber 1-40 is scanned in the XY directions to form a subsequent section solidified image 1-44b on the solidified image 1-44a.

The above operation is repeated to finally form a laminated solidified image having the desired model shape in the liquid.

A more detailed explanation will be omitted since the above concept is basically disclosed in Japanese Patent Laid-open Publication No. 56-144478.

Reference number 1-28 in FIG. 1C denotes an external system connected to the present system by way of on-line or off-line connection. Such an external system may be selected from a three-dimensional CAD system, three-dimensional measuring instrument, continuous tomographic system, etc. These are merely exemplary, and it is sufficient for the external system to have data relating to a three-dimensional shape of the model.

If the form of data included in the external system 1-28 is of a triangular patch type, the data is directly stored into a triangular patch type desired model shape data storing means 1-7 (FIG. 1B) in the present system.

If the form of data included in the external system 1-28 is of any types other than the triangular patch type, the data is once converted into the triangular patch type by a triangular patch type converting means 1-31 in the present system, and is then stored into the storing means 1-7.

Figure 3:
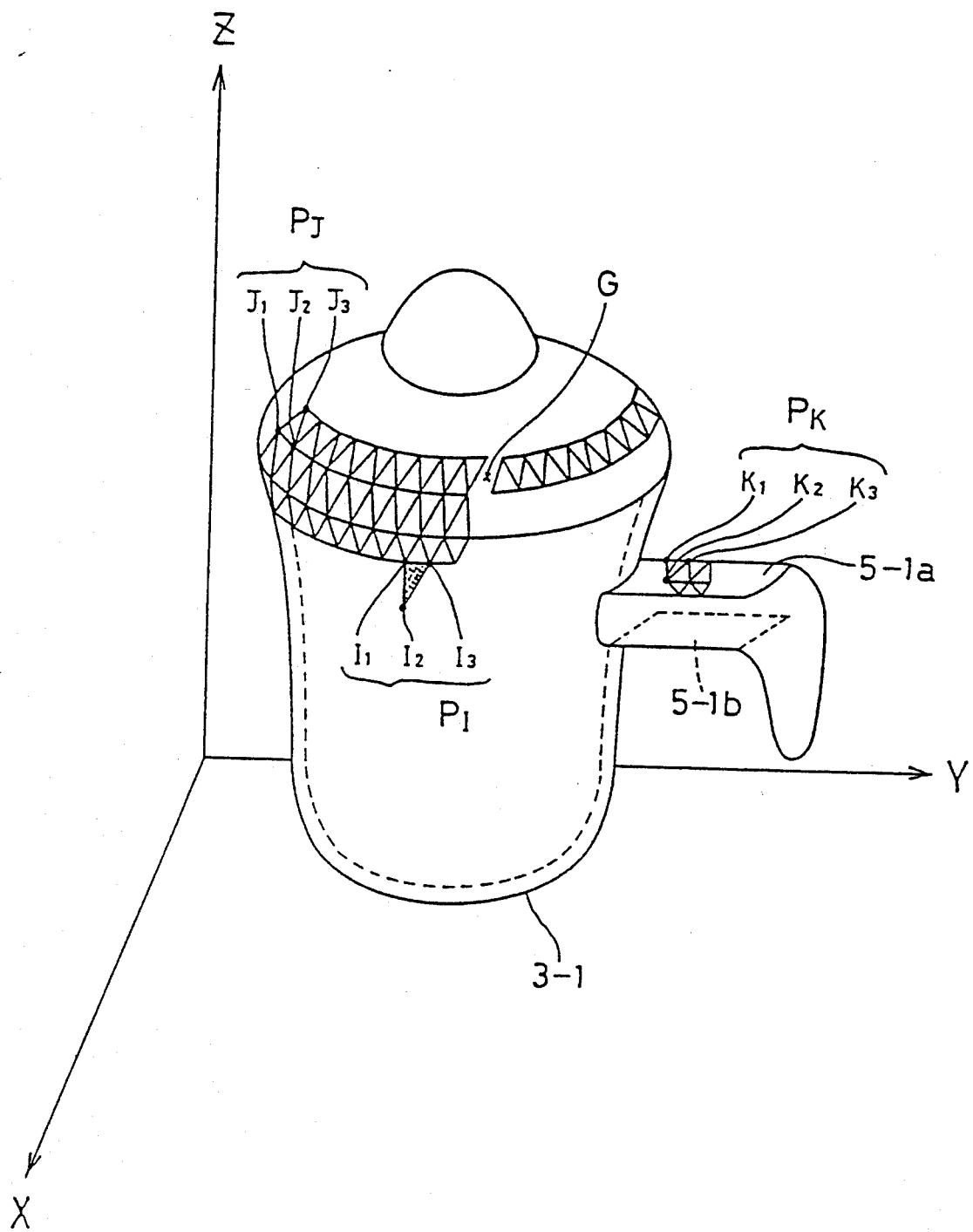
FIG. 3 is a schematic perspective view illustrating a triangular patch type of three-dimensional shape data.

A schematic construction of the triangular patch type is shown in FIGS. 3 and 4.

As apparent from FIG. 3, the three-dimensional shape is defined as a set of many triangular patches $P_I$, $P_J$, $P_K$, etc. in the triangular patch type. In FIG. 3, a part of the set of these triangular patches is simply shown for the purpose of legibility of illustration.

Each triangular patch is defined in position and shape by XYZ coordinates of three vertexes. For instance, the patch $P_J$ is given XYZ coordinates of three vertexes $I_1$, $I_2$ and $I_3$.

Accordingly, the three-dimensional shape data of the triangular patch type has a structure as shown in FIG. 4.

The data having the structure shown in FIG. 4 and stored into the storing means 1-7 is editable by a data editing means 1-8 shown in FIG. 1B (see step 2-8 in FIG. 2A). In this editing operation, the desired mode shape data can be expanded, contracted, rotated or corrected. Especially, in the correcting operation, a support data for supporting the desired model shape may be added. Further, a new three-dimensional shape data may be created by using this correcting function.

When an operator of this system sets a unit thickness and a beam diameter by using a unit thickness setting means 1-1 and a beam diameter setting means 1-2 shown in FIG. 1A (see step 2-1 in FIG. 2A), a perspective view of the edited desired model shape sliced with the unit thickness is displayed on a two-dimensional display 1-32 (see step 2-50 of simulation and step 2-32 of displaying in FIG. 2A). Then, the operator confirms whether or not the modeling is to be started under the above condition, and if NO in step 2-51, the operator resets the condition (see the loop from step 2-51). If the condition is satisfied, the following processing is executed in the present system.

First, a beam scanning speed computing means 1-9 shown in FIG. 1B computes an optimum scanning speed for solidifying the unit thickness set by the means 1-1 with the beam diameter set by the means 1-2.

Then, a horizontal plane extracting means 1-10 is started in step 2-10 to extract a horizontal plane from the desired model shape.

Figure 5A:
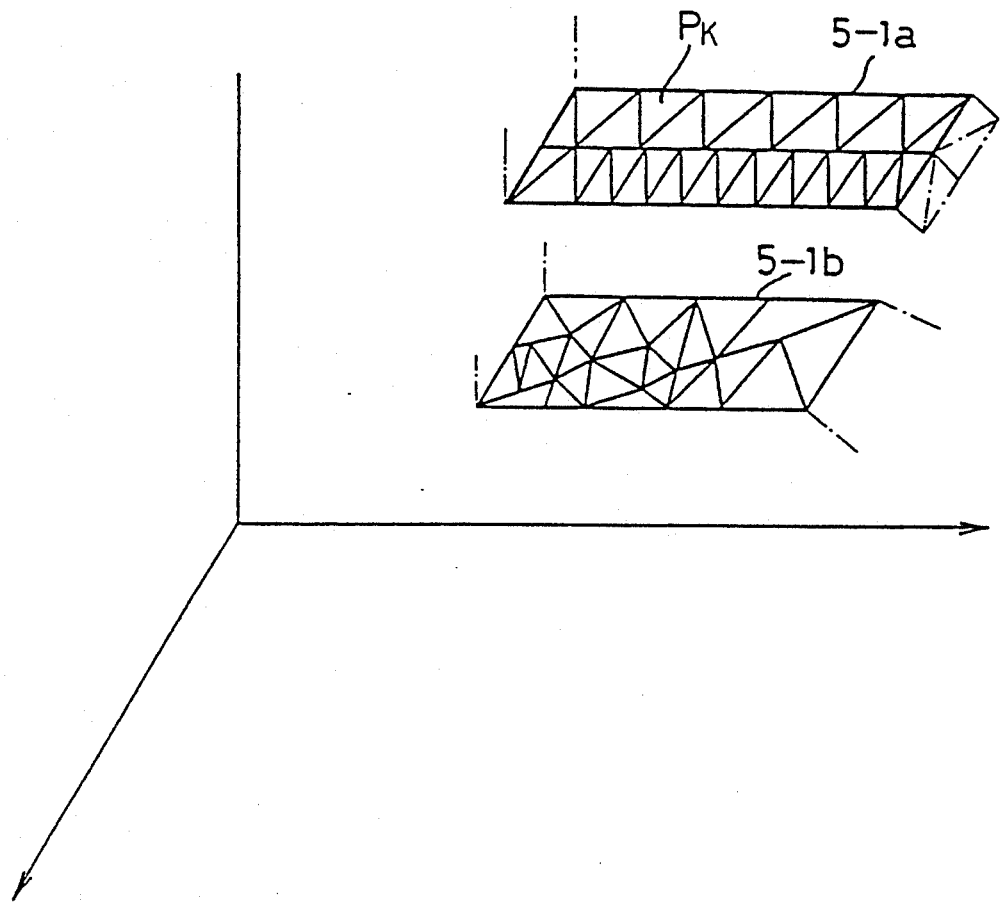
FIG. 5A is a perspective view of an example of a horizontal plane extracted.
Figure 5B:
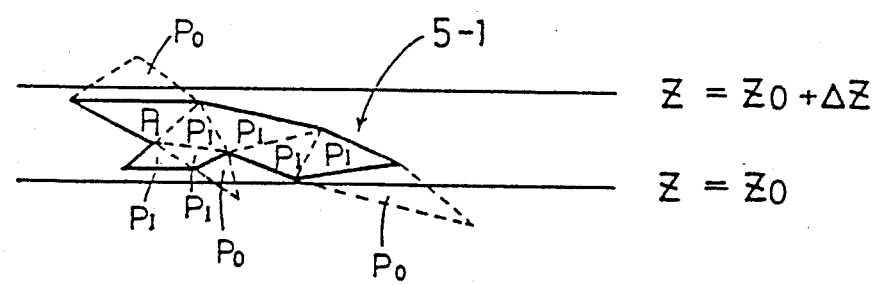
FIG. 5B is a schematic illustration of extraction of a horizontal plane.

In this preferred embodiment, the unit thickness $\Delta Z$ set by the means 1-1 is employed, and as shown in FIG. 5B, the triangular patches each having the three vertexes all contained within the height range of $\Delta Z$ are searched to compute an outside contour 5-1 of the set of these triangular patches.

FIG. 5B shows a virtual side view of these triangular patches, in which the three vertexes of each patch $P_I$ reside inside the width of the unit thickness $\Delta Z$, and at least one of the three vertexes of each patch $P_O$ reside outside the width of the unit thickness $\Delta Z$. Thus, the contour 5-1 of the horizontal plane is extracted and computed from the outermost line of the set of the patches $P_I$.

The inside surrounded by the contour 5-1 in the horizontal plane extracted above is uniformly exposed to light to be solidified. FIG. 5A is a virtual view of horizontal planes 5-1a and 5-1b extracted from the triangular patch data shown in FIG. 3.

Then, the present system executes computation of a contour by using a contour computing means 1-11 shown in FIG. 1B (see step 2-11 in FIG. 2A).

Figure 6:
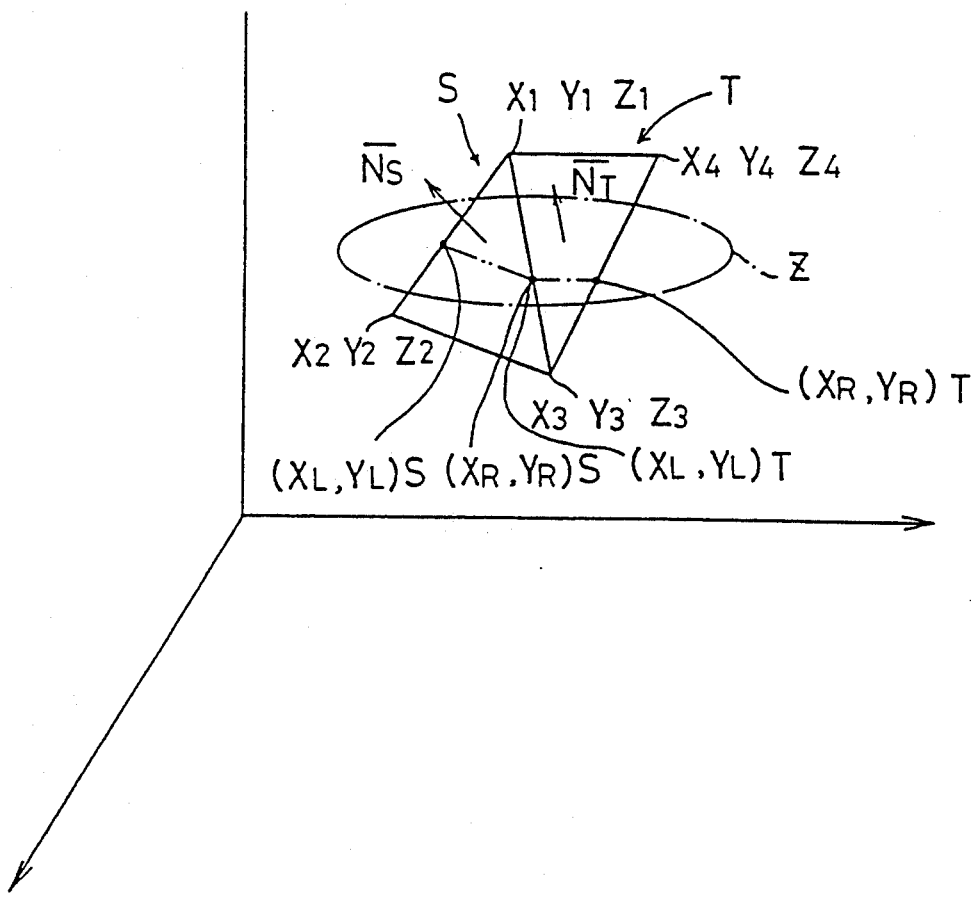
FIG. 6 is a schematic illustration of extraction of a contour.

FIG. 6 is a schematic illustration of the contour computing, in which each unhorizontal triangular patch (patches S and T being exemplarily shown in FIG. 6) intersects a horizontal plane Z sliced with the unit thickness $\Delta Z$, and two intersections between each patch and the plane Z are computed.

As shown in FIG. 6, the two intersections between the patch S and the plane Z are denoted by $(X_L, Y_L)S$ and $(X_R, Y_R)S$, while the two intersections between the patch T and the plane Z are denoted by $(X_L, Y_L)T$ and $(X_R, Y_R)T$. As both the patches S and T are adjacent to each other, a common intersection resides on the adjacent line. That is, the intersection $(X_R, Y_R)S$ is equal to the intersection $(X_L, Y_L)T$.

Figure 7:
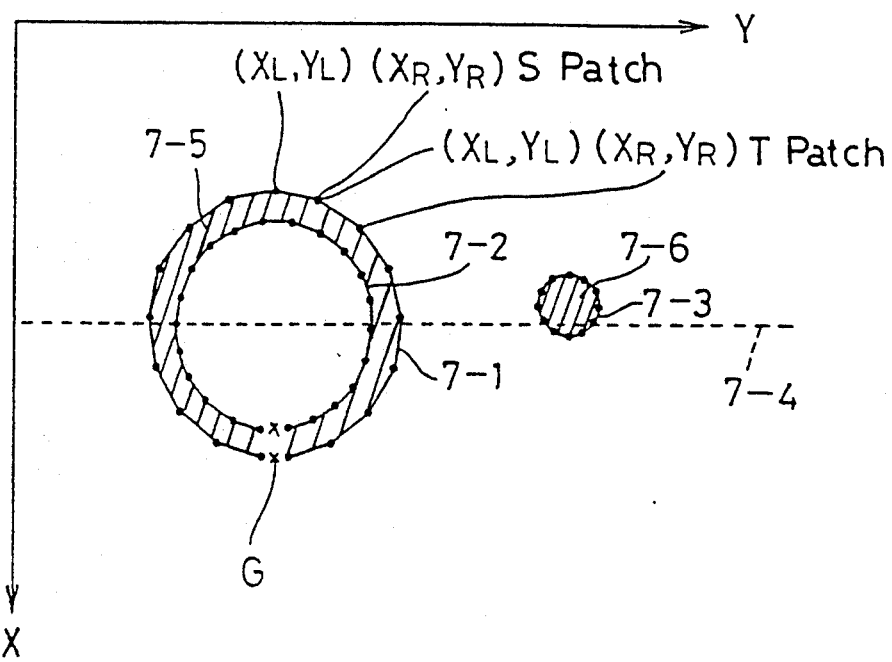
FIG. 7 is a plan view of the contour extracted.

Then, on the basis of these intersection coordinates computed above, plural contours 7-1, 7-2, 7-3, etc. in a certain section as shown in FIG. 7 are executed and computed.

As shown in FIG. 3, there is a case that the triangular patches in some section are not continuous to define a gap G. That is, the extracted contours 7-1 and 7-2 do not form a closed curve. In this case, the nearest intersections are searched, and they are connected together to thereby obtain a closed curve. As shown in FIG. 7, the contours thus computed are classified into a group for forming a desired model shape inside the contour (e.g., 7-1) and a group for forming the desired model shape outside the contour (e.g., 7-2). Such classification is effected by searching the contours along a search line 7-4 from the left side, for example, and giving an inside indicating flag for the contour 7-1 first intersecting the search line 7-4 and an outside indicating flag for the contour 7-2 secondly intersecting the search line 7-4.

Referring back to FIG. 1B, the present system includes a beam corresponding solidifying region data computing and storing means 1-12. The means 1-12 computes and stores a sectional shape of a region to be solidified when the beam having the beam diameter set by the means 1-2 is scanned at the speed computed by the means 1-9. That is, as shown in FIG. 8C, the means 1-12 computes and stores a sectional shape F2 of a region F1 to be solidified when a light beam 8-12 is scanned as shown by an arrow 8-10. Then, a three-dimensional offset quantity computing means 1-13 shown in FIG. 1B computes a three-dimensional offset quantity for the horizontal line data extracted by the means 1-10 and the contour data computed by the means 1-11 by using a solidifying region data computed by the means 1-12.

The computation of such a three-dimensional offset quantity will now be described with reference to FIGS. 8A to 8C and FIGS. 9A to 9F.

Figure 8A:
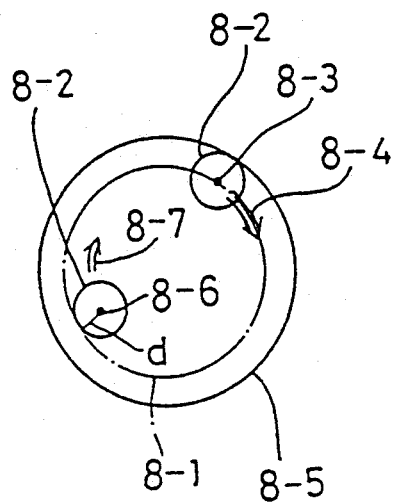
FIG. 8A is a plan view illustrating a conventional offsetting method.

Referring to FIG. 8A which is a plan view of the liquid surface, 8-2 denotes an exposure region of the light beam. In the case that a center 8-3 of the exposure region 8-2 is scanned along a contour 8-1 (computed by the means 1-11) as shown by an arrow 8-4, a contour 8-5 of a region to be solidified is undesirably formed outside the contour 8-1.

Figure 8B:
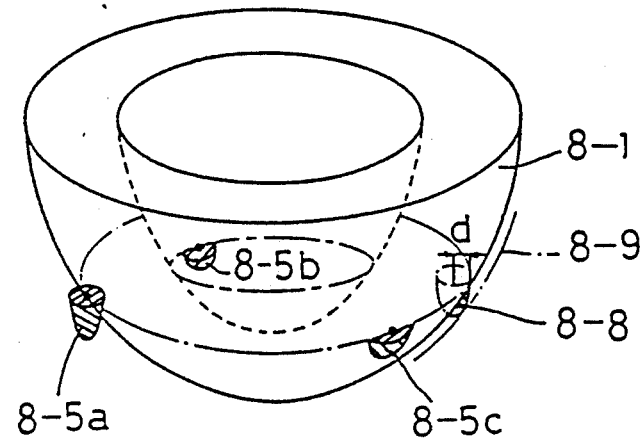
FIG. 8B is a three-dimensional view of FIG. 8A.
Figure 8C:
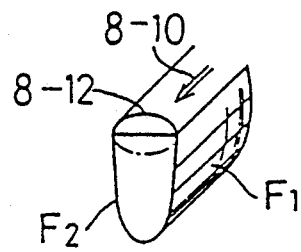
FIG. 8C is a perspective view of a solidified region formed by light beam exposure.

FIG. 8B is a stereoscopic view of FIG. 8A. As shown in FIG. 8B, in the case that the center of the light beam resides on the contour of the model, regions 8-5a, 8-5b, 8-5c, etc. are solidified, and the contour of an actual solidified region to be formed by continuously connecting outermost surfaces of the regions 8-5a, 8-5b, 8-5c, etc. does not coincide with the contour 8-1.

To avoid the above problem, the conventional photosolidification modeling device practically used at present is so designed as to scan the center of the light beam along a line offset inside of the contour by a radius of the beam as shown in a left lower area of FIG. 8A.

As shown in the left lower area of FIG. 8A, in the case that a center 8-6 of the light beam is offset inside of the exposure region 8-2 by a radius d of the light beam, a contour of the solidified region becomes coincident with the contour 8-1 as far as viewed in plan.

However, it is understood from FIG. 8B that a problem remains from a stereoscopic standpoint. As shown in FIG. 8B, 8-8 denotes a region to be solidified by the light beam offset inside by the radius d. Since the desired model shape is gradually narrowed to the lowermost surface, it is understood that a hatched portion of the region 8-8 is excessively solidified. Accordingly, a contour 8-9 of an actual model shape becomes outside the contour 8-1 of the desired model shape.

FIGS. 9A to 9F show a method of three-dimensionally offsetting the exposure region of the light beam, so as to eliminate the above problem.

Figure 9A:
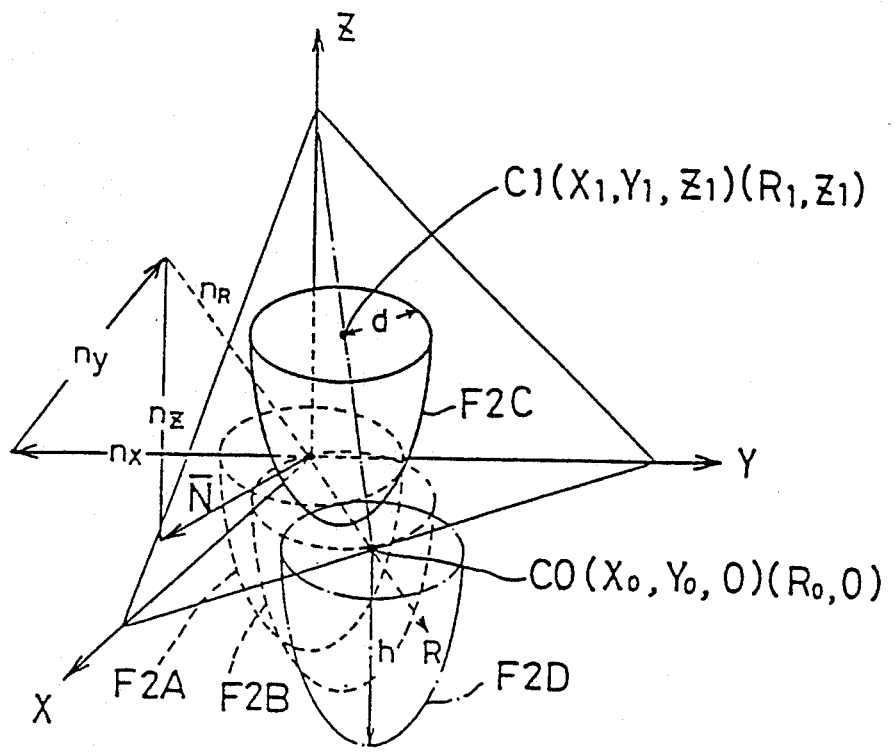
FIG. 9A is a three-dimensional view illustrating an offset quantity calculating method.

FIG. 9A shows a three-dimensional coordinate system wherein the origin coincides with one of the intersections between the triangular patch and the horizontal plane Z shown in FIG. 6. In this preferred embodiment, the origin of the coordinate system shown in FIG. 9A coincides with the intersection $(X_R, Y_R)S$ or $(X_L, Y_L)T$.

Referring to FIG. 9A, F2A to F2D denote a common three-dimensional shape to be formed by rotating the sectional shape F2 shown in FIG. 8C about the center of the beam, and $\overline{N}$ denotes a unit normal vector at the origin, i.e., the intersection $(X_R, Y_R)S$ or $(X_L, Y_L)T$. The unit normal vector $\overline{N}$ is calculated as a vector sum of unit normal vectors $\overline{N_S}$ and $\overline{N_T}$ with respect to the adjacent patches shown in FIG. 6. Direction of each of the unit normal vectors $\overline{N_S}$ and $\overline{N_T}$ is computed from the vertex coordinates of each patch, and the sense of each vector is defined with reference to the inside and outside indicating flags previously mentioned in relation to the search line 7-4 in FIG. 7. In this preferred embodiment, the sense of each vector is defined such that each vector is oriented from the inside to the outside of the desired model shape. The unit normal vector $\overline{N}$ thus computed has components $n_x$, $n_y$ and $n_z$.

Figure 9B:
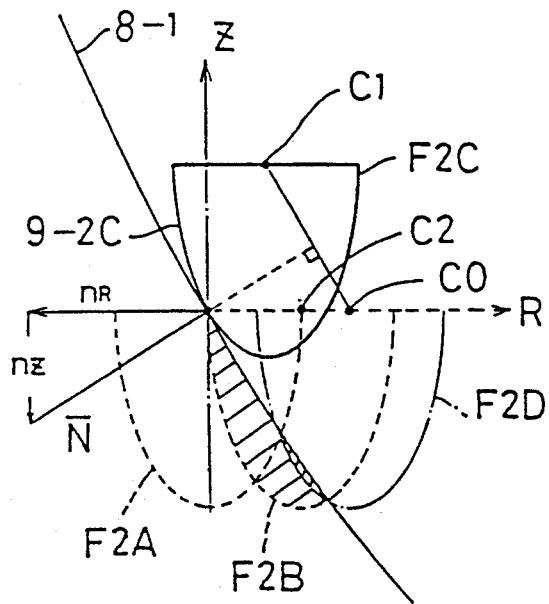
FIG. 9B is a vertical sectional view of FIG. 9A.

In FIG. 9A, $n_R$ denotes a vector having the components $n_x$ and $n_y$ in the XY plane, and an R axis is given in the direction of the vector $n_R$. FIG. 9B shows an RZ plane given in FIG. 9A.

As shown in FIGS. 9A and 9B, F2A denotes a solidified region to be obtained when the beam center coincides with the intersection (i.e., the origin in this case). It is apparent that a large proportion of the solidified region F2A is formed outside the contour 8-1. F2B denotes a solidified region to be obtained when the beam center is offset inside the contour 8-1 along the R axis by the radius d. It is understood that a hatched portion of the solidified region F2B is formed outside the contour 8-1. In contrast, F2C denotes a solidified region to be obtained when the beam center C1 is offset inside the contour 8-1 so that a three-dimensional contour 9-2c of the solidified region F2C passes the intersection (the origin) and that a normal vector for the contour 9-2c coincides with the normal vector $\overline{N}$ for the contour 8-1 at the origin. In other words, the solidified region F2C is offset inside the contour 8-1 so that the contour 9-2c of the solidified region F2C contacts the contour 8-1 at the origin.

In this case, assuming that the solidified region F2C is a spheroid having a minor axis "d" and a major axis "h", the above relation can be satisfied by offsetting the beam center by a distance $R_1$ along the R axis and a distance $Z_1$ along the Z axis, wherein $R_1$ and $Z_1$ are defined as follows:

$$R_1 = d^2 n_R / (h^2 n_z^2 + d^2 n_R^2)^{\frac{1}{2}}$$

$$Z_1 = h^2 n_z / (h^2 n_z^2 + d^2 n_R^2)^{\frac{1}{2}}$$

where $n_R = (n_x^2 + n_y^2)^{\frac{1}{2}}$

On the other hand, F2D denotes a solidified region to be obtained by moving the solidified region F2C in a direction perpendicular to the normal vector $\overline{N}$ in the RZ plane so that a Z coordinate of the beam center C0 becomes zero.

As apparent from FIG. 9B, a portion of the solidified region F2D outside the contour 8-1 becomes substantially zero.

The solidified region F2D can be obtained by offsetting the beam center by a distance $X_0$ along the X axis and a distance $Y_0$ along the Y axis, wherein $X_0$ and $Y_0$ are defined as follows:

$$X_0 = n_x (d^2 n_x^2 + d^2 n_y^2 + h^2 n_z^2)^{\frac{1}{2}} / (n_x^2 + n_y^2)$$

$$Y_0 = n_y (d^2 n_x^2 + d^2 n_y^2 + h^2 n_z^2)^{\frac{1}{2}} / (n_x^2 + n_y^2)$$

In this case, the contour of the three-dimensional solidified region can be made substantially coincident with the contour of the desired model shape without changing the height of the beam center.

By using either the former method or the latter method, the means 1-13 computes an offset quantity of the beam center.

In the case of controlling the exposure region in every horizontal section as in this preferred embodiment, the latter method is suitably adopted. In the case of controlling the exposure region by immersing the tip of the optical fiber into the liquid and moving the tip in the XYZ directions, the former method may be adopted to three-dimensionally offset the beam center.

Figure 9C:
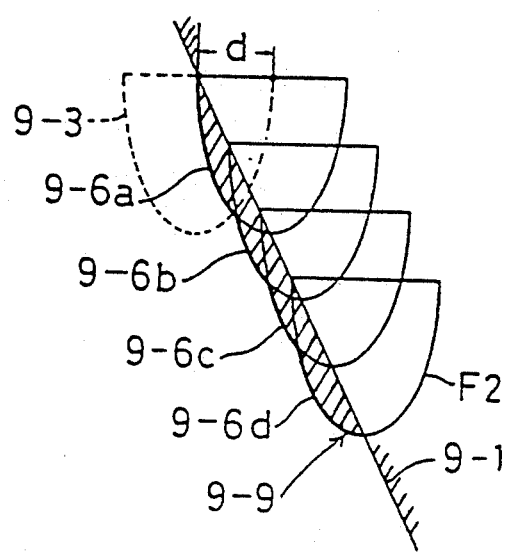
FIGS. 9C and 9D are vertical sectional views of a solidified region formed in consideration of an offset quantity in the case of using a light beam according to the prior art and the present invention, respectively.
Figure 9D:
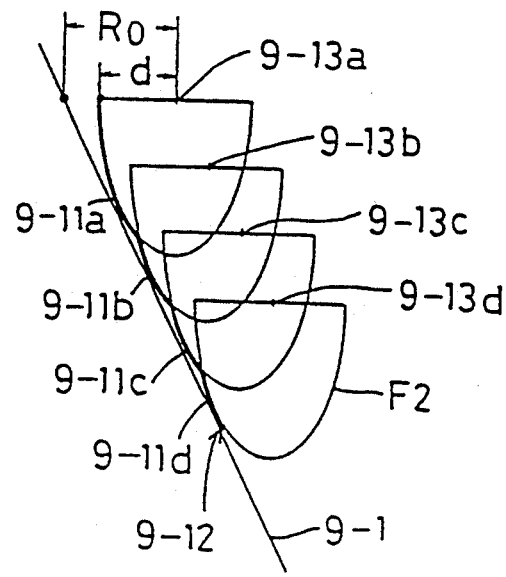

FIG. 9C shows a vertical section of a laminated solidified region in the case of offsetting the beam center by the radius d. In contrast, FIG. 9D shows a vertical section of a laminated solidified region in the case of offsetting the beam center by the distances $X_0$ and $Y_0$ as mentioned above. As apparent from FIGS. 9C and 9D, a contour 9-12 of the laminated solidified region according to the offsetting method of the present invention as shown in FIG. 9D is made substantially coincident with a contour 9-1 of the desired model shape.

Figures 9E, 9F:
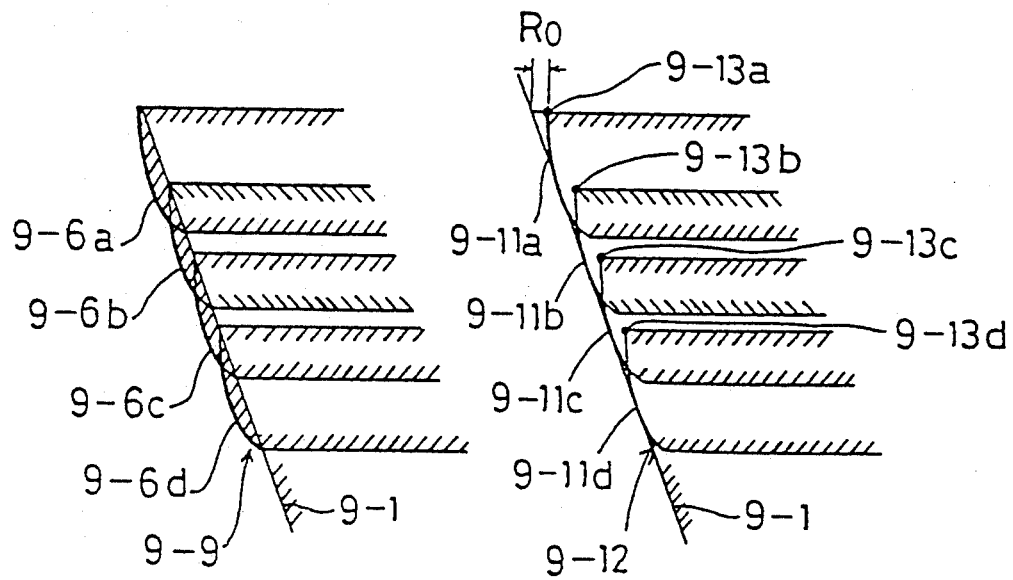
FIGS. 9E and 9F are views similar to FIGS. 9C and 9D, in the case of using a mask film.

The above-mentioned problem occurs not only in the case of using a light beam but also in the case of using a mask film or a projector to uniformly expose the liquid surface to light as shown in FIG. 9E.

FIG. 9E shows the case where a contour of each exposure region is made coincident with the contour 9-1 of the desired model shape. As apparent from FIG. 9E, hatched portions 9-6a, 9-6b, 9-6c, 9-6d, etc. of the exposure regions are excessively solidified to come outside of the contour 9-1.

In contrast, FIG. 9F shows the improvement of FIG. 9E, wherein contours 9-11a, 9-11b, 9-11c, 9-11d, etc. of the solidified regions are offset inside by the amount of $R_0$ so as to contact the contour 9-1. According to this method, a contour 9-12 of the solidified image can be made substantially coincident with the contour 9-1 of the desired model shape.

After the means 1-13 computes the optimum offset quantity as mentioned above, a contour corresponding exposure region data computing and storing means 1-14 computes and stores a data relating to a scanning position of the beam center for offsetting the exposure region by the computed offset quantity and solidifying the exposure region corresponding to the horizontal line extracted by the means 1-10 or the contour computed by the means 1-11.

In this preferred embodiment, the present system further includes a means 1-3 for setting an exposure mode for an inside region 7-5 surrounded by the contours 7-1 and 7-2 or an inside region 7-6 surrounded by the contour 7-3 as shown in FIG. 7, for instance (see step 2-3 in FIG. 2A).

This exposure mode is classified into a non-exposure mode, whole region exposure mode and spaced exposure mode.

In the first case of setting the non-exposure mode by using a means 1-3a, a hollow model solidified at the contour only is fabricated as shown in FIG. 10F. In this mode, an outer surface 10-2a shown in FIG. 10F corresponding to a contour 10-2 shown in FIG. 10A is solidified, and an inner surface 10-3a shown in FIG. 10F corresponding to a contour 10-3 shown in FIG. 10A is also solidified. However, an inside region between the contours 10-2 and 10-3 is not solidified to define a hollow portion 10-8, thus fabricating a hollow model.

This mode is effective in the case where the model shape only is important, and the strength is not so demanded. As the exposure region is small, a modeling time can be shortened.

In the second case of setting the whole region exposure mode by using a means 1-3b, the inside region between the contours 10-2 and 10-3 is wholly solidified to fabricate a solid model as shown in FIG. 10B. This mode is suitable in the case where the strength of the model is demanded.

In the third case of setting the spaced exposure mode by using a means 1-3c, the operator can select one of a normal cross mode (FIG. 10C), alternate cross mode (FIGS. 10D1 and 10D2), and stripe mode (FIG. 10E).

In the stripe mode shown in FIG. 10E, the inside region is spacedly exposed in one direction. In the normal cross mode shown in FIG. 10C, the inside region is spacedly exposed in two different directions in the same section. In the alternate cross mode shown in FIGS. 10D1 and 10D2, the inside region is spacedly exposed by alternating the scanning direction in the stripe mode in every section.

In the case of setting the spaced exposure mode, the operator can set by using a means $1-3c_1$ a desired pattern (i.e., normal cross, alternate cross or stripe), pitch and exposure width. The exposure width can be set to be different from the beam diameter set by the means 1-2.

According to the spaced exposure mode, a honeycomb structure is additionally formed in the hollow model to fabricate a honeycomb model.

After thus setting the exposure mode for the inside region, an offset means 1-17 is started. The offset means 1-17 computes an offset quantity shown in FIGS. 10G and 10H. Referring to FIG. 10G, 10-14 denotes a light beam for exposing the contour. The light beam 10-14 is scanned along an arrow 10-16 with the beam center being offset inside the contour to a position 10-15. On the other hand, 10-10 denotes a light beam for exposing the inside region. In the case that the scanning of the light beam 10-10 is stopped at a position where a leading end 10-11a of the light beam 10-10 contacts the circumference of the light beam 10-14, a contour corresponding solidified region 10-14a is not sufficiently connected to an inside region corresponding solidified region 10-10a as shown in FIG. 10H(1), with the result that a sufficient supporting effect by the honeycomb structure cannot be obtained.

Figure 10G:
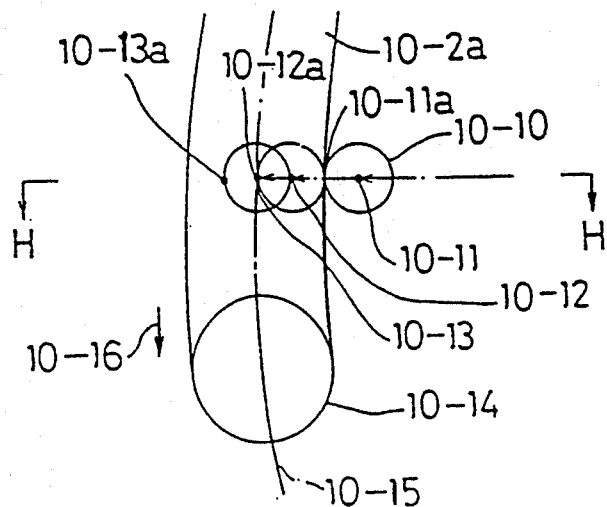
FIG. 10G is a plan view illustrating an offsetting method for the exposure region to be formed inside the contour.
Figure 10H:
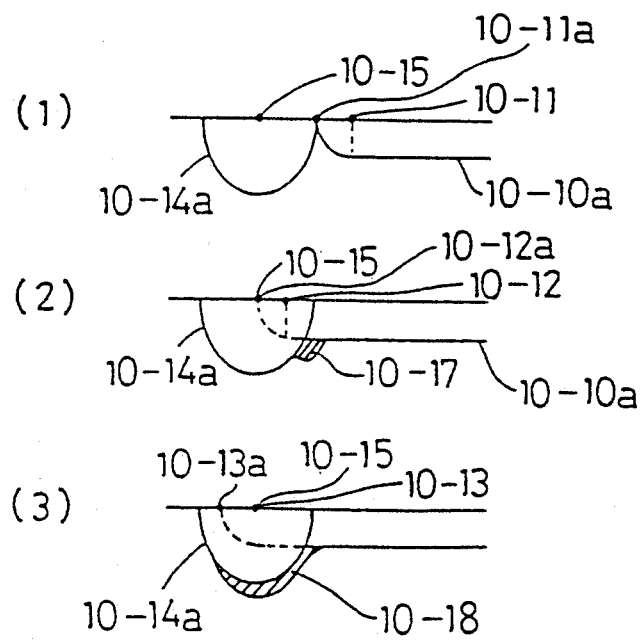
FIG. 10H is a cross section taken along the line H-H in FIG. 10G.

In contrast, when the scanning of the light beam 10-10 is stopped at a position where the beam center 10-13 of the light beam 10-10 coincides with the beam center 10-15 of the light beam 10-14, an extra solidified region 10-18 is formed by the beam 10-10 outside the circumference of the contour corresponding solidified region 10-14a as shown in FIG. 10H(3), with the result that the desired model shape cannot be precisely obtained.

In consideration of these problems, the offset means 1-17 computes an optimum offset quantity of the light beam 10-10 in such a manner that the scanning of the light beam 10-10 is stopped at a position where the leading end 10-12a of the light beam 10-10 contacts the beam center 10-15 of the light beam 10-14, that is, the beam center 10-12 of the light beam 10-10 is offset inside the circumference of the light beam 10-14 by a radius of the light beam 10-10 (see FIG. 10H(2)). The exposure region in the inside region is computed and stored by an inside region corresponding exposure region data computing and storing means 1-18 according to the information set by the means 1-3 and the offset quantity computed by the means 1-17 (see step 2-18 in FIG. 2A).

Such an overlapping range between the contour corresponding exposure region and the inside region corresponding exposure region may be appropriately set by the operator, within the range between FIGS. 10H(1) and FIG. 10H(3).

Figure 11A:
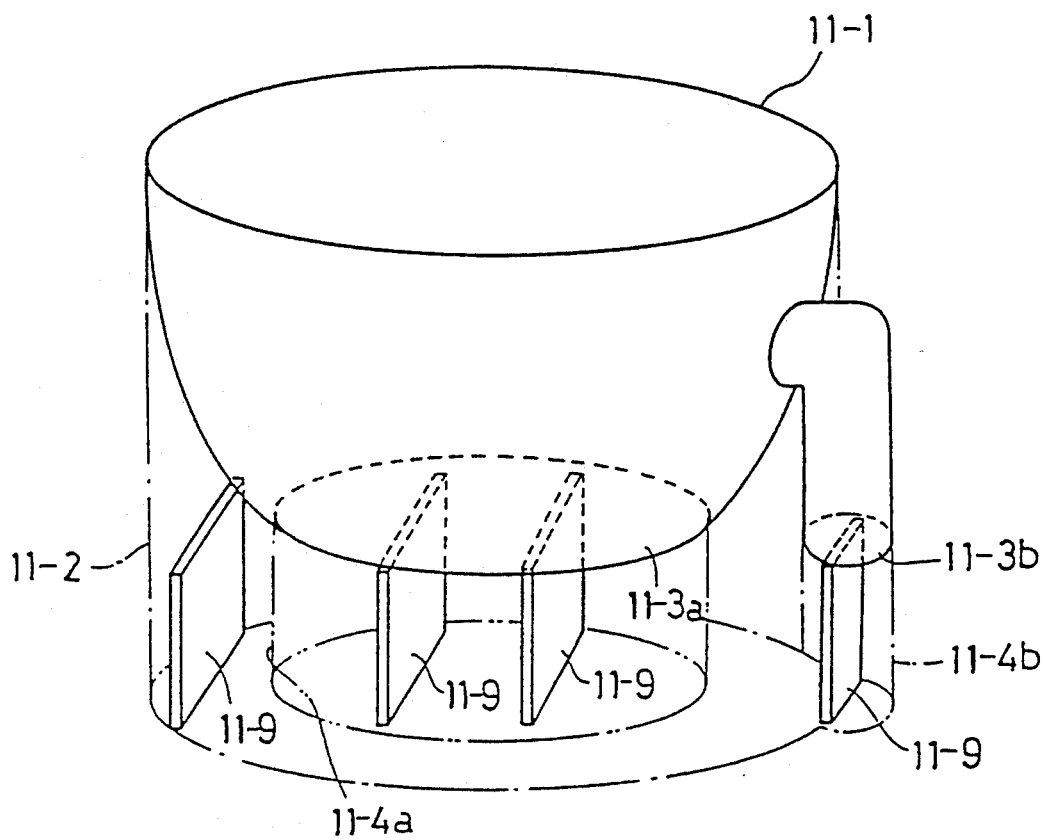
FIG. 11A is a perspective view of legs.

Further, the operator can set a leg data by using a means 1-4 included in the present system. Referring to FIG. 11A, 11-9 denotes a plurality of legs formed on the base 1-45. A desired model shape 11-1 is formed on the legs 11-9. If the solidified image of the model is directly laminated on the base 1-45 without the legs 11-9, the solidified image is broken or distorted when removed from the base 1-45. So, the legs 11-9 are provided for the purpose of prevention of this problem.

As shown in FIG. 11A, the legs 11-9 are formed in spatial ranges 11-4a and 11-4b corresponding to lowermost sections 11-3a and 11-3b searched by using a means 1-19. The legs 11-9 are also formed in a frame setting space 11-2 to be hereinafter described.

The leg data includes data of a leg height, pitch, line width and pattern (stripe, normal cross or alternate cross). These data are set by using means 1-4a and 1-4b. The leg data further includes data of whether an outline is present or absent. This data is set by using a means 1-4c.

The leg height means a height of each leg to be solidified prior to modeling of the desired model shape. The pattern, pitch and line width are the same as those previously mentioned. The outline means an outline to be formed along a boundary of a leg forming region.

In the case that the presence of the outline is set by the means 1-4c, a peripheral leg 11-7 (see FIG. 11D) or a peripheral leg 11-8 (see FIG. 11E) is formed along the boundary of the leg forming region 11-4a.

Figures 11B, 11C, 11D, 11E:
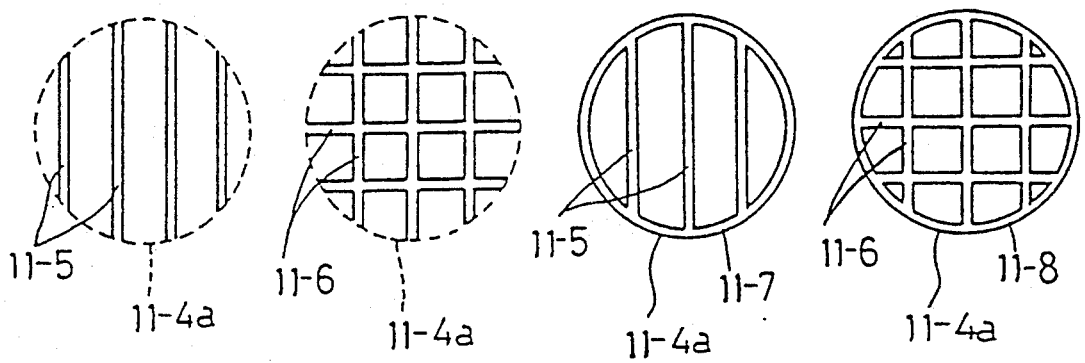
FIGS. 11B to 11E are plan views of various patterns of the legs.

In the case that the absence of the outline is set by the means 1-4c, no peripheral leg is formed as shown in FIGS. 11B and 11C.

FIGS. 11B and 11D show the case where the stripe mode is set to form stripe legs 11-5. FIGS. 11C and 11E show the case where the normal cross mode is set to form normal cross legs 11-6.

After the leg data is set by the means 1-4 (see step 2-4 in FIG. 2B), a leg corresponding exposure region data computing and storing means 1-20 computes and stores an exposure region data for the formation of the legs as referring to the leg data set above, the information of the lowermost section, and data relating to a frame setting space which will be hereinafter described (see step 2-20 in FIG. 2B).

The operator can set the frame setting space by using a means 1-5 in the present system. In this case, the operator can select whether a whole space is to be set by using a means 1-5a or a specific space is to be set by using a means 1-5b.

Figure 12A:
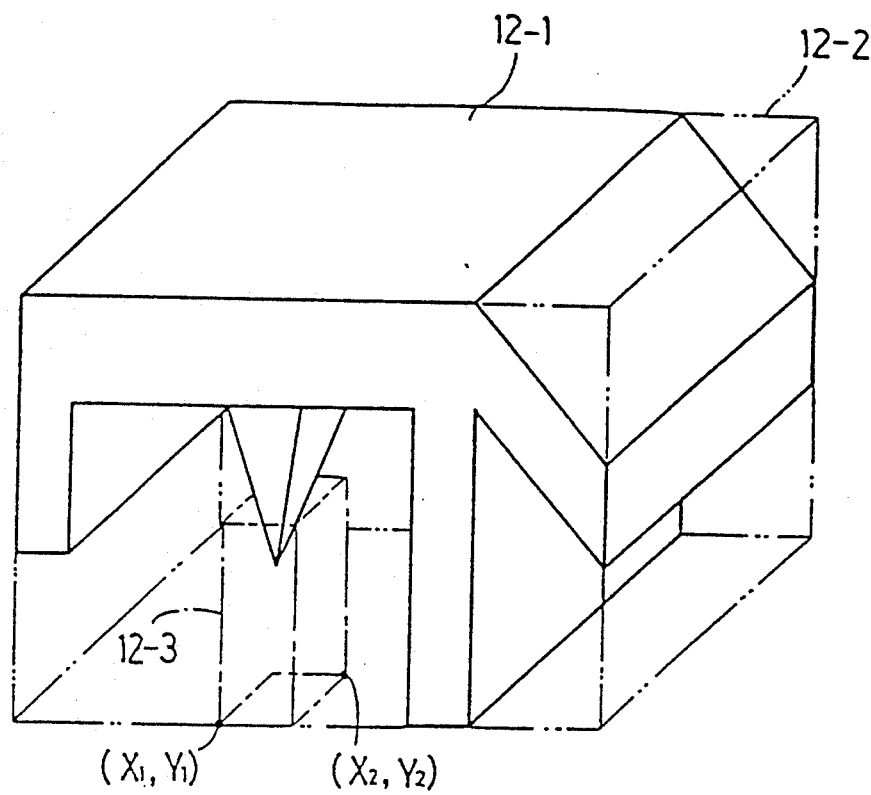
FIG. 12A is a perspective view of a frame.

In the case of setting the whole space, a maximum contour range computing means 1-21 is started to compute a rectangular parallelepiped 12-2 entirely covering a desired model shape 12-1 as shown in FIG. 12A. Then, a frame corresponding exposure region data computing and storing means 1-22 computes and stores an exposure region data for forming a frame to be solidified at four side walls of the rectangular parallelepiped 12-2.

In the case of setting the specific space, such a specific space is specified by coordinate data $(X_1, Y_1)$ and $(X_2, Y_2)$ of a diagonal as shown in FIG. 12A, and the means 1-22 computes and stores an exposure region data for forming a frame to be solidified at four side walls of a rectangular parallelepiped 12-3 having a rectangular bottom surface defined by the above diagonal.

The frame functions as a model shape supporting means in cooperation with a support to be formed inside the frame as will be hereinafter described.

Further, the operator can also set a support data by using a means 1-6.

The support data is set by specifying a pitch, line width, and pattern (stripe, normal cross or alternate cross) of a support to be formed in the frame space for every given height by using a means 1-6a.

After thus setting the support data, an exposure region data is computed so as to form the support in the frame space according to the support data set above.

More specifically, pattern data is previously stored in a regular regions (patterns) data computing and storing means 1-23, and one of the pattern data, that is, one of the stripe, normal cross and alternate cross is output from the means 1-23. Then, a support corresponding exposure region data computing and storing means 1-26 computes and stores an exposure region data for forming the support by using the above specified pattern data as well as the pitch and line width data.

Figure 12B:
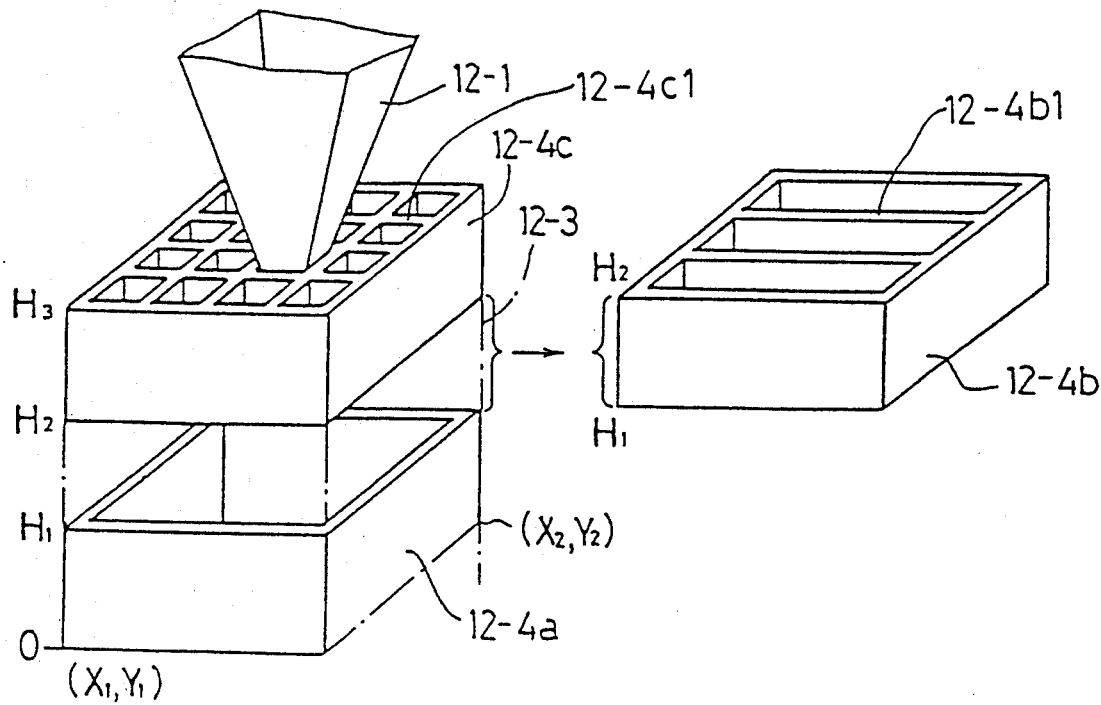
FIG. 12B is a perspective view of a supporting structure formed by the frame and support.

FIG. 12B shows a complex of frames 12-4a, 12-4b and 12-4c and supports 12-4b_1 and 12-4c_1 formed inside the frames 12-4b and 12-4c, respectively, in the frame space 12-3 as the rectangular parallelepiped shown in FIG. 12A. The complex consists of a first element formed by the frame 12-4a only in a height range $0-H_1$, a second element formed by the frame 12-4b and the stripe supports 12-4b_1 in a height range $H_1-H_2$, and a third element formed by the frame 12-4c and the normal cross supports 12-4c_1 in a height range $H_2-H_3$.

In setting the support data under the condition where the whole frame space is set, the operator can select one of a lower whole region, outside whole region, and inside and outside whole region by using a region setting means 1-6b.

Figures 13A, 13B, 13C:
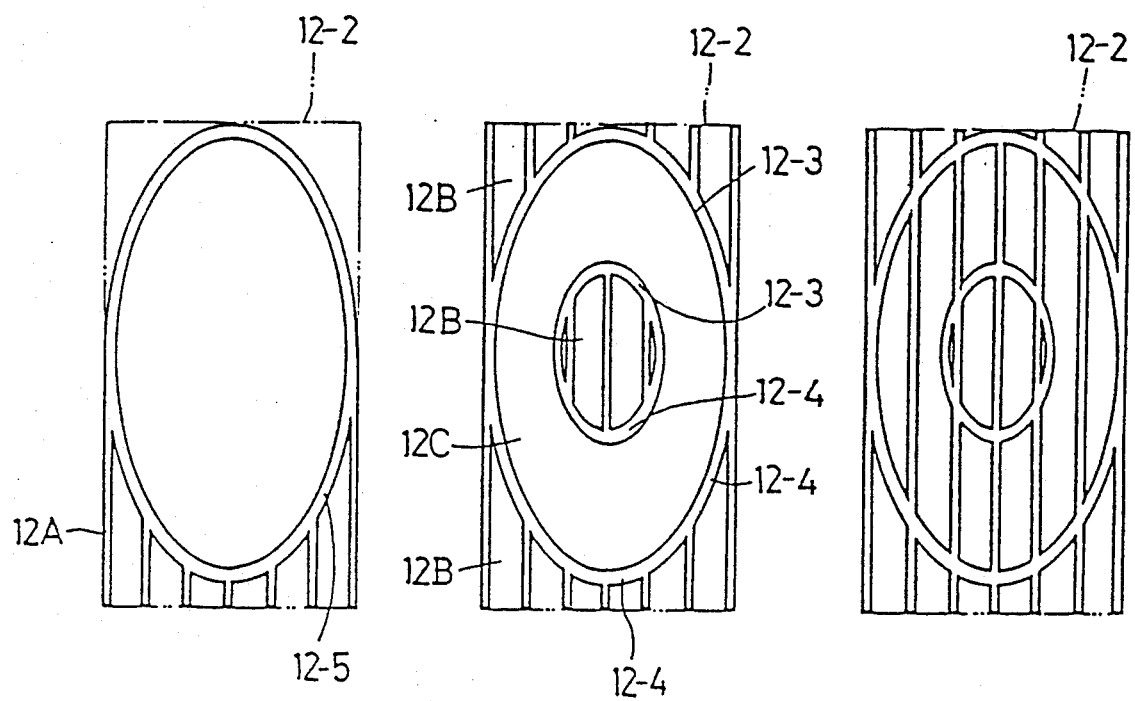
FIGS. 13A to 13C are vertical sectional views illustrating various modes for setting a support forming region.

More specifically, when the lower whole region is set by a means 1-6b_1, the support is formed in a lower region 12A of the frame space 12-2 below the desired model shape as shown in FIG. 13A (vertical section). In this case, a lowermost surface 12-5 of the desired model shape is searched by a lowermost contour surface searching means 1-24.

When the outside whole region is set by a means 1-6b_2, the support is formed in a whole region 12B of the frame space 12-2 outside the desired model shape as shown in FIG. 13B. In this case, upper surfaces 12-3 and lower surfaces 12-4 of the desired model shape are searched by an upper and lower contour surfaces searching means 1-25.

When the inside and outside whole region is set by a means 1-6b_3, the support is formed in the whole of the frame space 12-2.

Further, the present system also includes a means 1-15 for determining the continuity of a contour corresponding solidifying region.

Figure 14A:
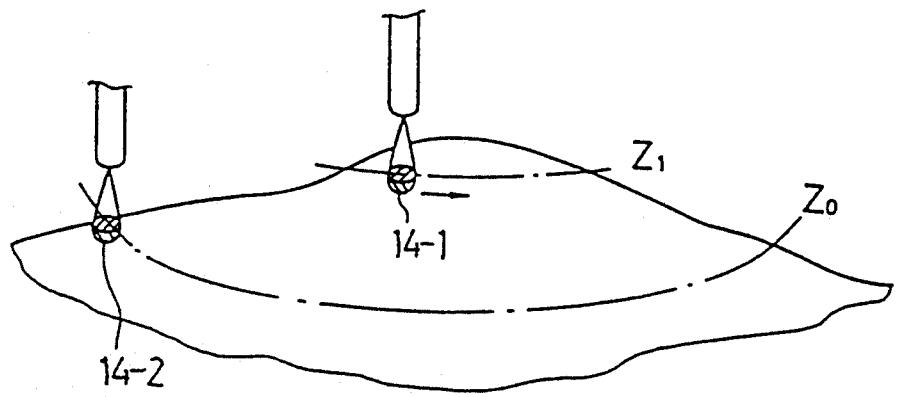
FIG. 14A is a perspective view illustrating a problem in the case of forming a hollow model having a gentle slant surface.
Figure 14B:
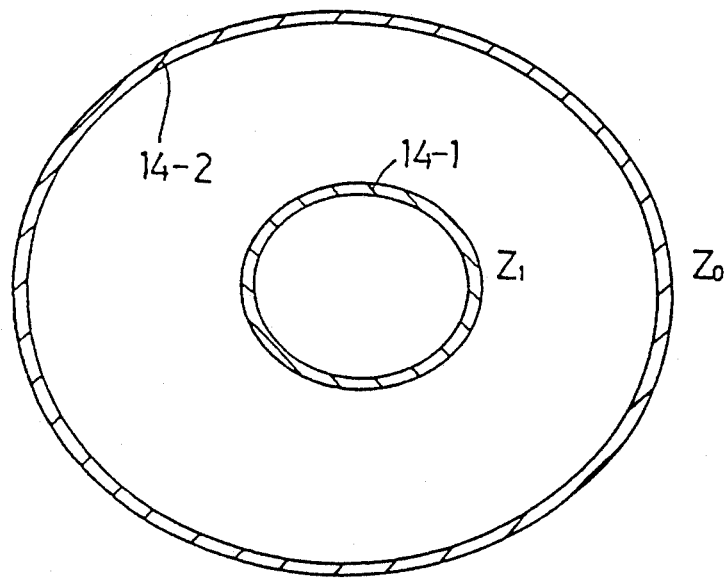
FIG. 14B is a horizontal sectional view of FIG. 14A.

As shown in FIG. 14A, for instance, the means 1-15 determines whether contour corresponding solidifying regions 14-1 and 14-2 in vertically adjacent sections $Z_1$ and $Z_0$ are continuous with each other. In the case that the sections $Z_1$ and $Z_0$ are largely different in size as shown in FIGS. 14A and 14B, the solidifying region 14-1 becomes discontinuous from the solidifying region 14-2. Accordingly, in the case of forming a hollow model, the solidifying region 14-1 would become in a floating state. To avoid this problem, the hollow model setting mode is forcibly converted into the solid model setting mode by a means 1-16, thereby exposing the whole inside region of the section $Z_0$ in this case to the light beam. As a result, even when the desired model shape has a gentle slant surface, a hollow model having a continuous peripheral surface can be fabricated.

As described above, the exposure region data corresponding to the contour, inside region, leg, frame and support are computed and stored in the respective computing and storing means 1-14, 1-18, 1-20, 1-22 and 1-26. Thereafter, the modeling is actually started. First, the leg is formed by the exposure according to the exposure region data corresponding to the leg. After the height of the leg becomes a predetermined value, the frame, support and inside region in the lowermost section are formed by the exposure according to the exposure region data corresponding to the frame, support and inside region. Finally, the contour is formed by the exposure according to the exposure region data corresponding to the contour.

By finally forming the contour as mentioned above, a local change in liquid level due to the fact that the liquid is surrounded by a solidified image can be suppressed to thereby minimize a distortion of the model shape during the modeling. In the actual control of the exposure, the filter 1-39 is controlled by an exposure intensity control means 1-33, and the XY driving mechanism 1-41 for moving the tip 1-40a of the optical fiber 1-40 in the XY directions is controlled by a horizontal exposure position control means 1-34. Further, a scanning speed is controlled by a scanning speed control means 1-35. The filter 1-39 and the scanning speed are controlled in coordination with each other.

Further, the lowering of the base 1-45 by the unit thickness $\Delta Z$ after the exposure for one section is carried out by a height control means 1-37.

After lowering the base 1-45 by the unit thickness $\Delta Z$, the brush 1-42 is moved in a direction (Y direction) perpendicular to a longitudinal direction (X direction) of the brush 1-42 by a brush sweeping control means 1-36.

Figure 15A:
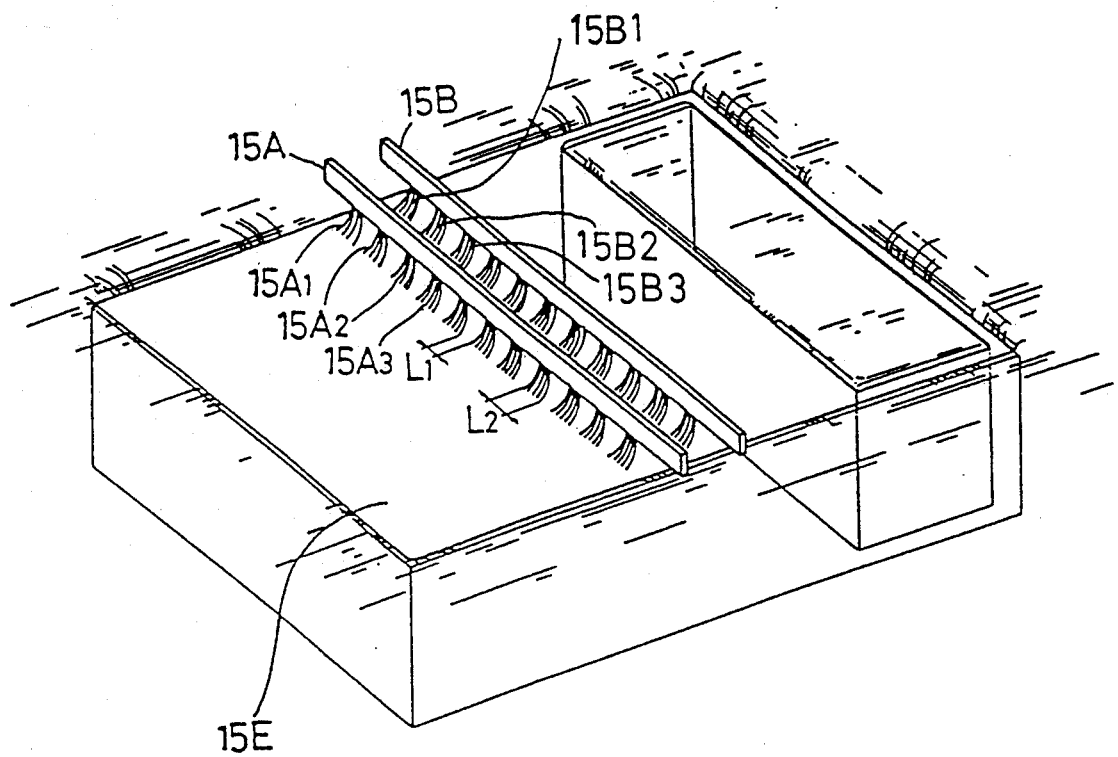
FIG. 15A is a perspective view of a brush.

Referring to FIG. 15A, the brush is comprised of a first brush 15A and a second brush 15B arranged in parallel to each other at a given interval and adapted to be moved together. The first brush 15A is provided with a plurality of brush elements $15A_1$, $15A_2$, $15A_3$, etc. spaced at regular intervals in the longitudinal direction of the first brush 15A. Similarly, the second brush 15B is provided with a plurality of brush elements $15B_1$, $15B_2$, $15B_3$, etc. spaced at regular intervals in the longitudinal direction of the second brush 15B in such a manner that the brush element $15B_1$ is located at a position opposed to a spacing between the brush elements 15A₁ and 15A₂ of the first brush 15A, and the other brush elements of the second brush 15B are also located in the same manner as above. With use of such a brush, the liquid can be coated with a uniform thickness even on a large solidified layer of the model shape as in the case of fabricating a solid model.

Figure 15B:
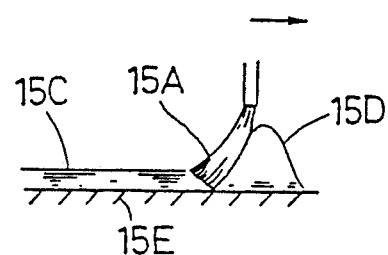
FIG. 15B is an enlarged side view of the brush.

As to the arrangement of the brush elements, the best result of coating of the liquid was obtained by setting a width L2 of each brush element to 2 mm and setting a spacing L1 between the adjacent brush elements to 1 mm. As shown in FIG. 15B, the liquid is carried as the form of waving 15D onto a solidified image 15E by the brush. Accordingly, if the spacing L1 is too wide, a good waving function cannot be obtained. Conversely, if the spacing L1 is too narrow, an amount of the waving 15D becomes large, and accordingly a coating layer 15C of the liquid cannot be desirably formed. Further, if a length of each brush element is too small, the waving 15D cannot be sufficiently formed, and an amount of the liquid to be retained among fibers of the brush element is not sufficient, resulting in defective coating. On the other hand, if the length of each brush element is too large, the amount of the waving 15D becomes large, resulting in defective coating.

Further, a material, thickness and sweeping speed of the brush element are also important. If the brush element is too hard, the solidified image is broken by the brush element. If the brush element is too soft, or the sweeping speed is too slow, the waving effect cannot be obtained. In these circumstances, these factors should be suitably selected in consideration of the properties of the liquid and the solidified image. In any cases, it is essential that the brush elements are to be spaced at regular intervals in the longitudinal direction of the brush, so as to obtain a good coating.

Further, since the first brush 15A and the second brush 15B are arranged in parallel as shown in FIG. 15A, the thickness of the coating layer 15C can be made uniform even in the case of sweeping a wide surface of the solidified image 15E.

According to the above preferred embodiment, the contour corresponding exposure region data is decided in consideration of a three-dimensional offset quantity with respect to a contour of a desired model shape. The three-dimensional offset quantity is a quantity for offsetting a contour of a solidified region so as to make the same contact the contour of the desired model shape. Therefore, the contour of the solidified region can be made precisely coincident with the contour of the desired model shape by the exposure according to the data decided in consideration of the offset quantity. Thus, the accuracy of the desired model shape can be greatly improved.

Furthermore, according to the preferred embodiment, it is possible to desirably select the solid, hollow or honeycomb model according to an intended use of the model. Accordingly, the intended use itself can be widened (for instance, the hollow model can be applied to a casting die), and a modeling time can be shortened according to the intended use of the model to thereby also widen the intended use of the system.

Furthermore, as the supporting structure (support and frame) is formed in the modeling of the desired model shape, the accuracy of the desired model shape can be highly retained. In connection with this, a diameter of the beam for forming this supporting structure can be set independently of that for forming the desired model shape. Accordingly, the supporting structure can be easily removed after the modeling is terminated.

Further, as the kind and exposure region of the supporting structure can be specified, the supporting structure can be formed at a necessary part only, thereby reducing the modeling time.

Further, as the frame can be set in relation to the support, the kind, pitch, etc. of the support can be modified in every height of the frame, thereby reducing the modeling time.

In addition, the liquid is coated on the solidified image by using the brush having a plurality of brush elements spaced at regular intervals. Therefore, the liquid can be coated with a uniform thickness in a short time, thereby improving the modeling accuracy and reducing the modeling time.

In conclusion, the system of the preferred embodiment includes various improvements in combination, which is superior to the conventional system.

While the invention has been described with reference to a specific embodiment, the description is illustrative and is not to be construed as limiting the scope of the invention. Various modifications and changes may occur to those skilled in the art without departing from the spirit and scope of the invention as defined by the appended claims.

What is claimed is:

1. A photo-solidification modeling device for forming a solidified model having a desired model shape by exposing to a light a liquid capable of being solidified on receipt of the light, the photo-solidification modeling device comprising:
   means for generating data indicative of said desired model shape;
   means for generating data indicative of regularly spaced regions independent of the generation of said data indicative of said desired model shape;
   means for combining said data indicative of said desired model shape and said data indicative of said regularly spaced regions to provide exposure region data; and
   means for exposing the light to the liquid in accordance with said exposure region data.

2. The photo-solidification modeling device of claim 1, wherein said means for generating said data indicative of said regularly spaced regions includes means for selecting a pattern of said regularly spaced regions from a plurality of predetermined regular patterns.

3. The photo-solidification modeling device of claim 1, wherein said means for generating said data indicative of said regularly spaced regions includes means for selecting a spatial range of said regularly spaced regions.

4. The photo-solidification modeling device of claim 3, wherein said means for selecting said spatial range of said regularly spaced regions includes means for selecting said spatial range as any one of a region outside said desired model shape, a region below said desired model shape, and a region both inside and outside said desired model shape.

* * * * *